Figure 1:
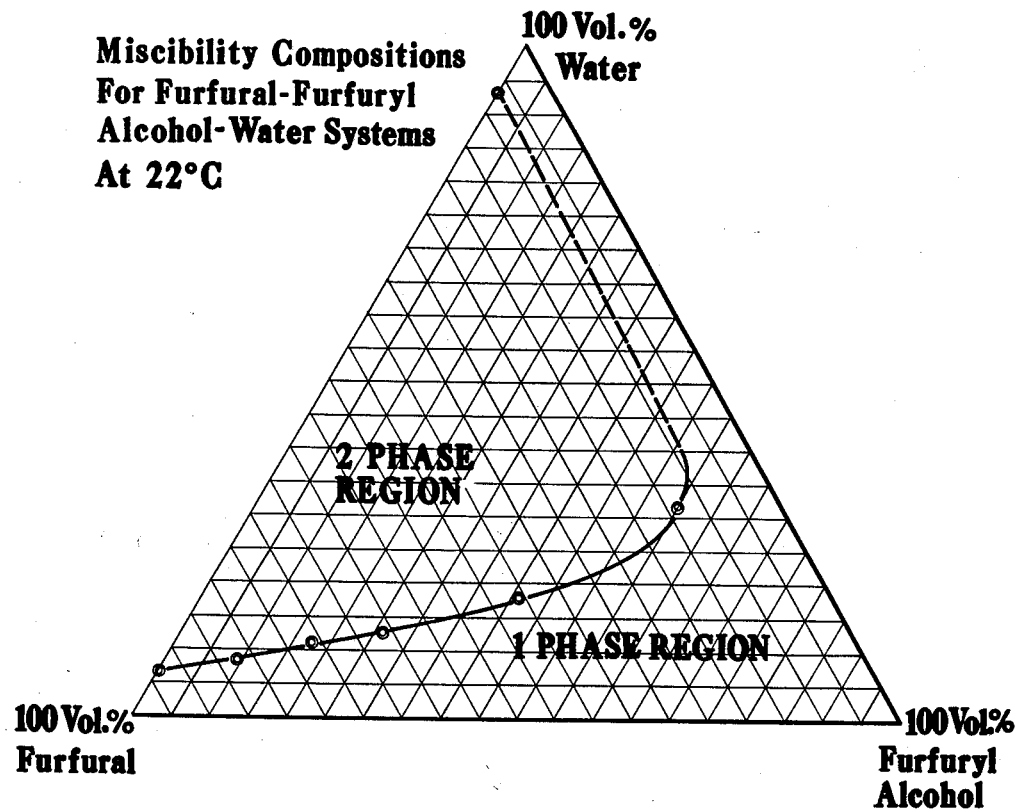

Extraction with Solvent "A" at 90°F

SOLVENT "A": 63 Vol. % Furfural
27 Vol. % Furfuryl Alcohol
10 Vol. % Water

3,168,463
SOLVENT EXTRACTION WITH A FURFURAL-FURFURYL ALCOHOL-WATER SOLVENT

Charles J. Norton, Denver, and Fred H. Poettmann, Littleton, Colo., assignors to The Marathon Oil Company, Findlay, Ohio, a corporation of Ohio
Filed Jan. 13, 1961, Ser. No. 82,433
17 Claims. (Cl. 208—323)

The present invention relates to refining hydrocarbon mixtures and is more particularly concerned with the separation of aromatic hydrocarbons from mixtures of hydrocarbons containing aromatic hydrocarbons. In accordance with the present invention, hydrocarbon mixtures or recovered fractions of natural hydrocarbon mixtures such as are obtained in the processing of petroleum oils, tars, and/or coal oil, shale oil, etc., are treated in a manner to provide a substantial segregation of the contained aromatics by utilizing an economical and easily used selective solvent.

It is well known that most mineral oils (which includes petroleum, coal, shale, etc. oils) contain aromatic hydrocarbons and fractions thereof produced by distillation, cracking, hydrogenation, and other treatments, contain various aromatic hydrocarbons mixed with paraffinic, olefinic, heterocyclic, etc. hydrocarbons. Most commercially important fractions of mineral oils are recovered by a fractionation process so that each particular fraction, which boils within a specific boiling range, contains various types of olefins, paraffins, aromatics, etc. Since many such compositions boil in close boiling range, even very careful fractional distillation will not separate the components. It is known, however, to separate various components from such a mixture by the use of selective solvent extraction, and particularly it is known to utilize a selective solvent to extract a substantial portion of the aromatic constituents from such a mixture. Many different types of solvents have been suggested for selective solvent extraction of various components of hydrocarbon mixtures and these include, among others, phenol, furfural, creosote, nitrobenzene, sulfur dioxide, diethylene glycol, polyethylene glycol, dimethyl formamide, etc., and, in certain instances, solid absorption agents such as silica gel, various synthetic resins and the like, may be used. Furfural, due to its cheapness, has found more commercial application than the other solvents, particularly in the petroleum industry.

In the selective solvent extraction for the separation of one component of a mixture one or more components of the mixture must be miscible with the selective solvent and the remainder must be less miscible so as to form two layers. Further, to provide a commercial operation the selective solvent must have a substantial capacity for the component to be separated so that the volumes of solution involved are not uneconomically large. Of the commonly known selective solvents few have found use in commercial operations since they are not entirely suitable in all respects, and they are found to have one or more disadvantages which may be poor selectivity, low capacity for absorption of the desired component, difficulties in recovery, instability of the selective solvent in the recovery system, expense of the selective solvent, etc.

Furfural has been known as a selective solvent for a substantial period of time, but while it has found wide use in the petroleum industry it has poor selectivity, requiring large volumes. Furfural is essentially insoluble in water, its miscibility in water being to about seven volume percent of water in the furfural. With the limited solubility of water and furfural the quality of the extract is poor. Thus, a primary limitation of a furfural system is its lack of proper range of solvent power with good selectivity and capacity.

According to the present invention we have discovered a solvent which is economical and provides high solvent power with good selectivity for the recovery of aromatic hydrocarbons from hydrocarbon feed mixtures. The selective solvent power of the invention provides a good solvent-to-oil ratio so as to maintain low volumes of selective solvents and yet maintain a good recovery of aromatic hydrocarbns from the feed material. The selective solvent of the invention is a ternary composition consisting of furfural-furfuryl alcohol and water composition as a selective solvent for producing an enriched extract of aromatic hydrocarbons from a feed of mixed hydrocarbons.

It is, therefore, included among the objects and advantages of the invention to provide a solvent which is highly selective for the aromatic hydrocarbons in a mixture with other types of hydrocarbons, which has a high capacity as well as high selectivity for the aromatics in a mineral oil or other hydrocarbon mixture or fraction thereof. The process of the invention requires a low solvent-to-oil ratio for a high yield recovery of aromatic hydrocarbons from mixtures containing the same. The selective solvent of the invention is economical and is usable in normal temperature and pressure ranges found in petroleum refineries.

Figure 2:
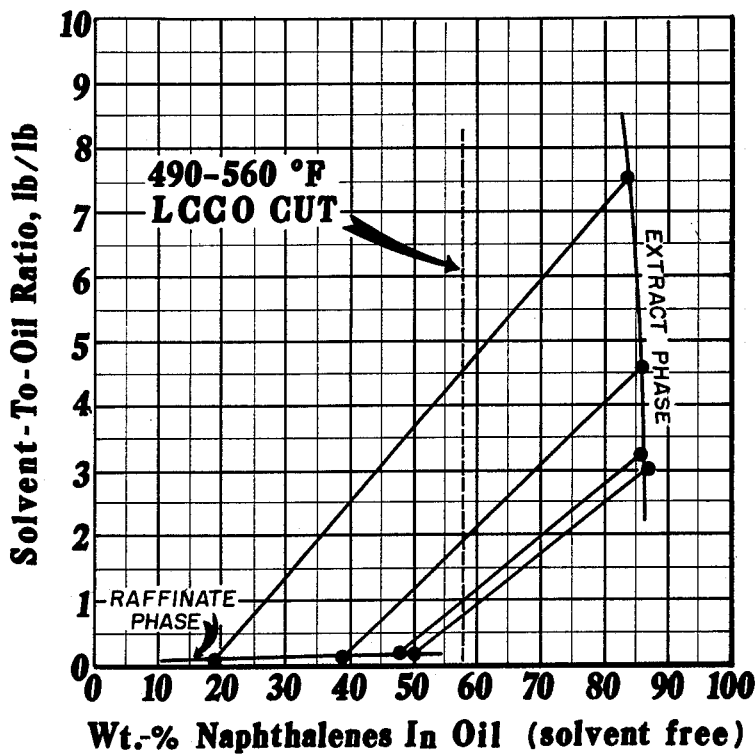
Figure 3:
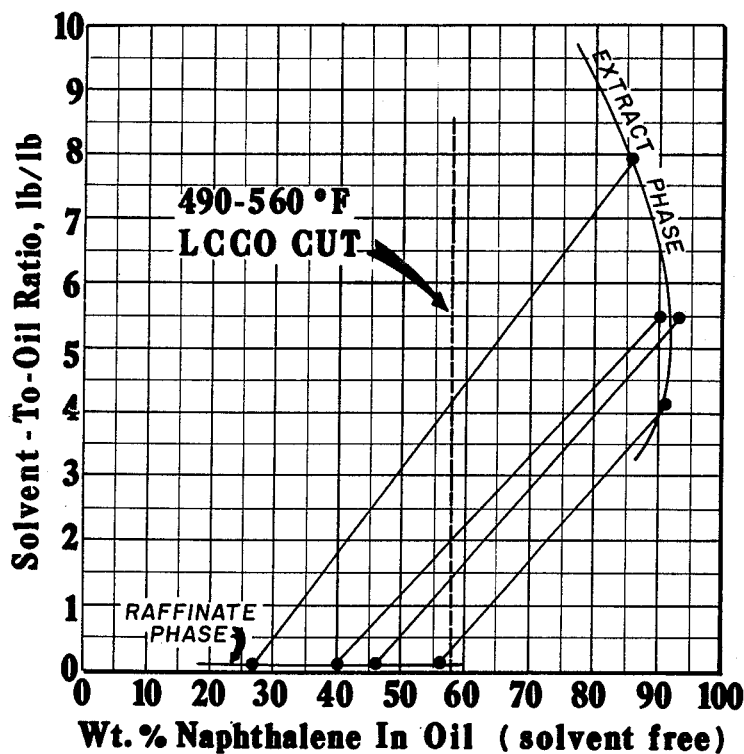

These and other objects and advantages of the invention may be readily ascertained by referring to the following description and appended illustrations in which:

FIG. 1 is a phase diagram of the ternary system comprising furfural, furfuryl alcohol and water; and FIGS. 2 and 3 are diagrams comparing the results of extraction of a catalytic cycle oil over a range of solvent-to-oil ratios, with the weight percent of naphthalenes in the solvent-free extracts and raffinate plotted against the solvent-to-oil ratio.

In the graphic representation of ternary compositions triangular graphs of the solubility-equilibrium relationships between the compounds are used. In such triangular graphs each apex of the triangle represents one component of the mixture. Any mixture of the three components is represented by a point in the graph. The equilibrium diagram is represented by the curve on the triangular graph. Thus, any mixture of a three component system which is represented by a point on the graph can be determined by the perpendicular distance from this point to any one side which is proportional to the percentage of the component represented by the opposite vertex. If two liquid compositions are mixed the compositions of the resultant solution is represented by a point on a straight line between the vertex of the two compositions represented on the triangular chart. The proportion of each original solution will be inversely proportioned to the distance between its composition point and the final composition point. For example, in the equilibrium diagram of FIG. 1 the point on the line between 100% water and 100% furfural shows that water is miscible in the furfural to the extent of only 7%. As furfuryl alcohol is added to the composition the equilibrium curve is plotted, and one region in the curve is shown and identified as a two-phase region and on the other side of the curve is a single-phase region where the three components are completely miscible. Thus, the shape of the curve must be determined by experimentation.

The solvent compositions of the invention consists of these three compounds and the proportions of each lie within the ranges of compositions in the one-phase region of FIG. 1, at room temperature or at about 22° C. For example, compositions in the range of from about 0.1 to 50.0 volume percent of water, 93 to 9% volume of furfural, and 0.1 to 80 volume percent of furfuryl alcohol provides a composition highly useful for the economical extraction of highly enriched fractions of aromatics from a mixture.

Preferably, the composition contains 5 to 25 volume percent of water and 90 to 10 volume percent of furfural with 5 to 80 volume percent of furfuryl alcohol. Similar diagrams, obviously, may be obtained experimentally for higher temperatures, and these show specific improvement of the selective solvent at the higher temperatures equivalent to that shown for the room temperature range. The following examples are presented as illustrations of the improved results obtained in using the selective solvent compositions according to the invention. The examples provide illustration of various temperatures, and such examples are not to be construed as limiting the invention to the precise details.

EXAMPLE I

A homogeneous solvent mixture was made of 10.0 ml. of water, 20.2 ml. of furfuryl alcohol, and 81.0 ml. of furfural. This provides a solvent having a composition according to the following:

9.0 volume percent water
18.0 volume percent furfuryl alcohol
73.0 volume percent furfural About 3.0 ml. of this prepared solution was shaken with about 6.0 ml. of light catalytic cycle oil having a refractive index of $n_D^{22.2}=1.5111$. (This light catalytic cycle oil was in the boiling range of 394–634° F.) After the ingredients were shaken together, the phases which subsequently formed, were physically separated. The lower extract phase amounted to 3.6 ml. and the upper raffinate phase was about 5.4 ml.

Samples of each of the extract and raffinate phases were washed four times with water to obtain a substantially solvent-free hydrocarbon mixture, and these had a refractive index of $n_D^{22.2}=1.5730$ and $n_D^{22.2}=1.4990$, respectively.

The extract yield was calculated from the blending equation:

Volume percent extract yield equals the refractive index of the light catalytic cycle oil minus the refractive index of solvent-free raffinate divided by the refractive index of the solvent-free extract minus the refractive index of the solvent-free raffinate, all times 100, and in this example, yields 16.4 volume percent.

The following table shows a comparison of the extraction results of the ternary solvent with light catalytic cycle oil compared to straight furfural and furfuryl alcohol.

Table 1
COMPARISON OF EXTRACTION RESULTS (2:1 O/S RATIO AT 22° C.)

| Solvent System | Washed Products | | Vol. Percent Yield |
|---|---|---|---|
| | $n_D^{20}$ Extract | $n_D^{20}$ Raffinate | |
| Furfural | 1.5611 | 1.4901 | 29.9 |
| Furfuryl alcohol | 1.5660 | 1.5029 | 13.3 |
| 9.1 vol. percent water 18.2 vol. percent furfuryl alcohol 72.7 vol. percent furfural | 1.5730 | 1.4990 | 16.3 |

As pointed out above, the most water that can be dissolved in furfural alone at about room temperature is in the neighborhood of 7 volume percent of water. The addition of about 9.9 volume percent of furfuryl alcohol makes it possible to co-solubilize up to about 9.0 volume percent of water in the solvent system, which provides a higher quality (more aromatic) extract than attainable with either furfural alone, furfural plus water, or furfuryl alcohol alone.

The following experiments were conducted with a light catalytic cycle oil which was cut in the boiling range of 490–525° F. which provides a cycle oil rich in methylnaphthalenes. Properties of this cut are summarized in the following table.

Table 2
FEED PROPERTIES

| B.P. Range | $n_D^{20}$ | Composition, wt. percent | | | |
|---|---|---|---|---|---|
| | | NN | MMN | DMN | TMN |
| 490–525° F. | 1.5226 | 42.5 | 7.0 | 21.0 | 29.5 |

In the above table NN equals non-naphthalene, MMN equals monomethylnaphthalene, DMN equals dimethylnaphthalene, and TMN equals trimethylnaphthalene.

EXAMPLE II

A solvent prepared by saturating a commercial sample of furfural with water at 22° C. (contains about 7.0 volume percent of water) was used to extract a sample of the hydrocarbon mixture referred to above in Table 2.

A batch extraction at a 1 to 1 oil-to-solvent ratio was effected by thoroughly shaking a mixture of 50.0 ml. of the oil and 50.0 ml. of the solvent at about 90° F. (32° C.). This extraction yielded a raffinate phase consisting of about 29.0 ml. and an extract phase of about 71.0 ml. The thoroughly washed extract phase, which is essentially solvent-free, had a refractive index of $n_D^{20}$ 1.5597. A gas-liquid chromatographic analysis of this extract indicated that it contained about 35.0 weight percent of non-naphthalenes, about 10.0 weight percent of monomethylnaphthalenes, about 49.0 weight percent of dimethylnaphthalenes, and 6.0 weight percent of trimethylnaphthalenes.

EXAMPLE III

A similar solvent to that of Example II was prepared by saturating a commercial sample of furfural with water about 22° C. to yield a solvent containing about 7.0 weight percent of water. This solvent was used to extract a hydrocarbon feed mixture which is the light catalytic cycle oil specified in Table 2. A btach extraction at about a 1 to 0.33 oil-to-solvent ratio was conducted by thoroughly shaking a thermostated mixture of 75 ml. of oil with 25 ml. of the solvent at about 90° F. The raffinate resulting from this extraction consisted of about 83.0 ml. while the extract phase contained about 17.0 ml. A 16.0 ml. sample of the extract phase was distilled in a laboratory distillation apparatus to yield about 6.5 ml. (which is equivalent to 40.6 volume percent of the extract phase) of recovered solvent. The pot residue amounted to about 9.5 ml. which had a refractive index of $n_D^{20}=1.5452$, which represents about 12.7 volume percent yield.

Gas-liquid chromatographic analysis of this extract indicated about 34.5 weight percent of non-naphthalenes, 8.5 weight percent of monomethylnaphthalenes, 43.5 weight percent of dimethylnaphthalenes, and about 9.5 weight percent of trimethylnaphthalenes, and about 4.0 weight percent of solvent.

EXAMPLE IV

A solvent similar to that in Example II which consists of commercial furfural saturated with water at about 22° C. was again shaken with a light catalytic cycle oil of the analysis of Table 2 was shaken together at a 1 to 3 oil-to-solvent ratio. After thoroughly mixing about 25 ml. of oil and 75 ml. of solvent at about 90° F., the recovered raffinate phase consisted of about 10 ml. and the extract phase about 90 ml. On distillation of the extract phase there was about 84.0 volume percent of the solvent recovered, and the pot residue had a refractive index of $n_D^{20}=1.5639$, representing about a 32 volume percent yield.

A gas-liquid chromatograph analysis of this extract indicated about 27.0 weight percent of non-naphthalenes, about 10 weight percent of monomethylnaphthalenes, 49.0 weight percent of dimethylnaphthalenes, and 9.5 weight percent of trimethylnaphthalenes, with about 4.5 weight percent of solvent.

The results of the extractions of Examples II, III and IV are summarized in the following Table 3. It is noted that the extracts obtained in the 10-fold range of oil-to-solvent ratios of 1 to 3 to 1 to 0.33 was ranged in refractive index from $n_D^{20}$ 1.5452 to $n_D^{20}$ 1.5639. These extracts all contain large amounts of non-naphthalenes and prove that the solvent system is of rather poor selectivity. The water-saturated solvent obviously cannot be further improved by water since it is already saturated.

$n_D^{20}=1.5603$ as a pot residue at about 13.6 volume percent yield. A 45.0 ml. sample of the raffinate phase was distilled up to about 180° giving about 2.9 ml. of recovered solvent and about 42 ml of oil, $n_D^{20}=1.5151$.

EXAMPLE VII

A solvent was prepared by admixing 10 volume percent of water, 27 volume percent of furfuryl alcohol, and 63 volume percent of furfural. This solvent was used to extract the oil of Example II at a solvent-to-oil ratio of 36 ml. to 54 ml. at about 90° F. The separated mixture yielded 50.6 ml. of raffinate phase and 39.4 ml. of the extract phase.

Again, portions of these phases were distilled and the extract phase distilled up to 168° C. to provide a pot residue having a refractive index of $n_D^{20}=1.5705$ at a yield of about 18.4 volume percent. From the raffinate phase was recovered an oil having a refractive index of $n_D^{20}=1.5107$.

*Table 3*

COMPARISON OF EXTRACTIONS WITH WATER-SATURATED FURFURAL

| Solvent Composition | Oil/Solvent Vol. Ratio | Raffinate/ Extract Phase Vol. Ratio | Recovered Extract Properties | | | | |
|---|---|---|---|---|---|---|---|
| | | | $n_D^{20}$ | Gas-Liquid Analysis, wt. Percent | | | |
| | | | | NN | MMN | DMN | TMN |
| Furfural saturated with water (ca. 7.0 wt. percent water) | 1:3 | 4.88 | 1.5452 | 27.0 | 10.0 | 49.0 | 9.5 |
| Do | 1:1 | 0.41 | 1.5597 | 35.0 | 10.0 | 49.0 | 6.0 |
| Do | 1:0.33 | 0.11 | 1.5639 | 34.5 | 8.5 | 43.5 | 9.5 |

EXAMPLE V

A solvent was prepared by admixing 10 volume percent water, 90 volume percent commercial furfuryl alcohol. The oil used was the same as that of Example II of the table which is a light catalytic cycle oil in boiling range of 490–525° F.

A thermostated mixture of about 36.0 ml. of the solvent and 54.0 ml. of the oil was shaken at about 90° F. The resultant raffinate phase amounted to about 49.7 ml. and the extract phase to about 40.3 ml.

Portions of these two phases were then separately distilled, and a 35.5 ml. volume of the extract phase was distilled up to about 168° C. which gave 29.5 ml. of recovered solvent and 5.2 ml. of extract having a refractive index of $n_D^{20}=1.5610$. This pot residue is equal to about 11.0 volume percent yield. About 45.0 ml. volume of the raffinate phase gave about 1.5 ml. of recovered solvent on distillation up to about 180° C. and 43.5 ml. of oil, $n_D^{20}=1.5164$.

EXAMPLE VI

A solvent was prepared by admixing 10 volume percent of water, 36 volume percent of furfural, and 54 volume percent of furfuryl alcohol. The oil to be extracted was the light catalytic cycle oil in the boiling range of 490–525° F. of Example II.

A thermostatic mixture of 36.0 ml. of solvent and 54.0 ml. of oil was thoroughly shaken at about 90° F. and after settling this resulted in a raffinate phase of about 51.7 ml. and an extract phase of 38.3 ml.

Portions of these product phases were then distilled. The extract phase was distilled up to about 168° C. and gave 28.5 ml. of recovered solvent and 7.0 ml. extract, Examples V, VI and VII are summarized in Table 4 for comparison.

*Table 4*

COMPARISON OF EXTRACTION RESULTS FOR WATER FURFURYL-ALCOHOL-FURFURAL SOLVENT SYSTEM

| Solvent Composition | Oil/Solvent Vol. Ratio | Raffinate/ Extract Phase Vol. Ratio, ml./ml. | Solvent-Free Products | | Extract Yield, Vol. Percent |
|---|---|---|---|---|---|
| | | | $n_D^{20}$ Extract | $n_D^{20}$ Raffinate | |
| 10% H₂O, 90% furfuryl alcohol | 1:0.67 | 49.7:40.3 | 1.5610 | 1.5164 | 11.0 |
| 10% H₂O, 36% furfural, 54% furfuryl alcohol | 1:0.67 | 61.7:38.3 | 1.5603 | 1.5151 | 13.6 |
| 10% H₂O, 63% furfural, 27% furfuryl alcohol | 1:0.67 | 50.6:39.4 | 1.5705 | 1.5107 | 18.4 |

The solvent of Example V, which is furfuryl alcohol and water, gave an extract having a refractive index of $n_{D20}$ 1.5610, which, when compared with Examples II, III and IV, showed that it is not substantially better than furfural. From the previous results, and from Example V, the normal expectation of a composition such as water, furfuryl alcohol and furfural mixtures would be an extract of low refractive indices not substantially higher than that obtainable with the 10 volume percent water and 90 volume percent furfuryl alcohol system. The results shown in Examples VI and VII show substantial improvement over that found with the solvent mixtures of Examples II, III, IV and V. The interaction of the solvent components, therefore, is unexpected, noting specifically the substantial increase in yield as well as an increase in quality of the aromatic extract.

The following Examples VIII–XI, inclusive, illustrate the effects of the oil-to-solvent ratio change, using a solvent comprising 10 volume percent water, 36 volume percent furfural and 54 volume percent furfuryl alcohol.

EXAMPLE VIII

The solvent, consisting of about 10.0 volume percent water, 36.0 volume percent furfural and 54.0 volume percent furfuryl alcohol was used to extract a cycle oil of the characteristics of that of Example II, which is a light catalytic cycle oil in the boiling range of 490–525° F.

A thermostated mixture of 18.0 ml. of solvent and 72 ml. of oil was thoroughly shaken at about 90° F. to ultimately yield 75.7 ml. of raffinate phase and 16.3 ml. of the extract phase. On distillation in a packed column, 13.5 ml. of the extract phase gave 10.5 ml. of recovered solvent and 1 ml. of extract, $n_D^{20}=1.5909$ at about 1.7 volume percent yield. Gas-liquid chromatograph analysis of this extract oil indicated it to be comprised of 8.6 weight percent of non-naphthalenes, 8.1 weight percent of monomethylnaphthalenes, 38.9 weight percent dimethylnaphthalenes and 44.5 weight percent trimethylnaphthalenes.

Distillation of 40.3 ml. volume of the raffinate gave 3.3 ml. of recovered solvent and 38.7 ml. of the oil as pot residue, $n_D^{20}=1.5214$. Gas-liquid chromatograph analysis of this raffinate oil indicated it to be comprised of 46.0 weight percent of non-naphthalenes, 3.0 weight percent monomethylnaphthalenes, 21.0 weight percent of dimethylnaphthalenes, and 30.0 weight percent of trimethylnaphthalenes.

EXAMPLE IX

Following the procedure of Example VIII a mixture of 36.0 ml. of the solvent was shaken with 54.0 ml. of the oil to ultimately yield a 52.8 ml. of raffinate phase and 39.5 ml. of extract phase. On distillation, 25 ml. of the extract phase gave 20.7 ml. of solvent and 2.7 ml. of extract, $n_D^{20}=1.5898$ at about 7.9 volume percent yield. Liquid-gas chromatograph analysis of this extract indicated it to be comprised of about 6.5 weight percent non-naphthalenes, 6.3 weight percent monomethylnaphthalenes, 41.5 weight percent of dimethylnaphthalenes, and about 45.8 weight percent of trimethylnaphthalenes. Distillation of a 25 ml. sample of the raffinate phase gave 1.1 ml. of recovered solvent and 22.5 ml. of oil as pot residue, $n_D^{20}=1.5156$. Gas-liquid chromatograph analysis of the raffinate oil indicated it to be comprised of about 54 weight percent of non-naphthalenes, 20.0 weight percent of dimethylnaphthalenes, and 26.0 weight percent of trimethylnaphthalenes.

EXAMPLE X

Following the procedure of Example VIII, 54.0 ml. of the solvent was shaken with about 36.0 ml. of oil at about 90° F. to yield 30.0 ml. of raffinate phase and 61.5 ml. of extract phase. On distillation of a 40 ml. of sample extract phase the solvent yield was 33.2 ml., and the yield of oil was 6.8 ml. or about 29.0 volume percent yield. Distillation of 25.0 ml. of the raffinate phase gave 1.1 ml. of recovered solvent and 22 ml. of oil, $n_D^{20}$ 1.5050. Liquid-gas chromatograph analysis of this oil indicated 60 volume percent of non-naphthalenes, 17 volume percent dimethylnaphthalenes, and 23 volume percent of trimethylnaphthalenes.

EXAMPLE XI

Following the procedure of Example VIII the solvent and oil were thoroughly shaken together at a ratio of 72.0 ml. of solvent to 18.0 ml. of oil at about 90° F. The resultant raffinate phase amounted to about 11.0 ml. and the extract phase to about 81.0 ml. Distillation of 45 ml. of the extract phase gave 39.5 ml. of solvent and 2.5 ml. of extract, $n_D^{20}=1.5832$ at about 25.0 volume percent yield. Gas-liquid chromatograph analysis of this extract indicated it to be comprised of about 10.9 weight percent of non-naphthalenes, 6.2 weight percent of monomethylnaphthalenes, 35.3 weight percent dimethylnaphthalenes, and 47.2 weight percent of trimethylnaphthalenes. The solvent-free raffinate had a refractive index of about $n_D^{20}=1.4844$ and a gas-liquid chromatograph analysis indicated this oil to be comprised of about 73.0 weight percent of non-naphthalenes, 12.0 weight percent dimethylnaphthalenes, and about 15.0 weight percent of trimethylnaphthalenes.

The results of the extractions in Examples VIII through XI, inclusive, are summarized in Table 5 for ready comparison.

*Table 5*

EXTRACTIONS WITH WATER-FURFURYL ALCOHOL-FURFURAL SYSTEM AT VARIOUS OIL-TO-SOLVENT RATIOS

| Solvent Composition | Oil/Solvent Vol. Ratio | Raffinate/Extract Phase Ratio, ml./ml. | Solvent-Free Products | | Extract Yield, Vol. Percent |
|---|---|---|---|---|---|
| | | | $n_D^{20}$ Extract | $n_D^{20}$ Raffinate | |
| 10% water<br>36% furfural<br>54% furfuryl alcohol | 1:0.25 | 75.7/16.3 | 1.5909 | 1.5214 | 1.7 |
| 10% water<br>36% furfural<br>54% furfuryl alcohol | 1:0.67 | 52.8/39.5 | 1.5898 | 1.5156 | 7.9 |
| 10% water<br>36% furfural<br>54% furfuryl alcohol | 1:1.5 | 30.0/61.5 | -------- | 1.5050 | 29.0 |
| 10% water<br>36% furfural<br>54% furfuryl alcohol | 1:4 | 11.0/81.0 | 1.5832 | 1.4844 | 25.0 |

It is to be noted that highly aromatic extracts with refractive indices in the range of 1.5832 to 1.5909 are obtained in the solvent composition over the 10-fold range of extraction oil-to-solvent ratios of 1–4 to 1–0.25. In comparing the results of the extractions of Table 5 with those of Table 3, it is shown that the water-furfuryl alcohol-furfural system is greatly superior to the water-saturated furfural solvent used heretofore.

EXAMPLE XII

A solvent mixture for Examples XII through XV is prepared by admixing 10.0 volume percent of water, 27.0 volume percent of furfuryl alcohol and 63.0 volume percent of furfural. This solvent was used to extract oil of a variable ratio of light catalytic cycle oil which was the same as that of Example II in the boiling range of 490–525° F.

A thermostated mixture of about 48.0 ml. of solvent and 192.0 ml. of oil was thoroughly shaken at about 90° F. to yield about 212 ml. of raffinate phase and 31.0 ml. of extract phase. On distillation in the packed column, about 25 ml. of the extract phase gave 20.0 ml. of recovered solvent and 6.2 ml. of extract, $n_D^{20}=1.5843$ which amounts to about 4.0 volume percent yield. Gas-liquid chromatograph analysis of this extract oil indicated it to be comprised of 12.8 weight percent non-naphthalenes, 8.1 weight percent of monomethylnaphthalenes, 37.7 weight percent of dimethylnaphthalenes, and about 41.4 weight percent of trimethylnaphthalenes. Distillation of a 50.0 ml. sample of the raffinate phase gave 5.4 ml. of recovered solvent and 44.4 ml. of the oil as pot residue, $n_D^{20}=1.5211$. Gas-liquid chromatograph analysis of the raffinate oil indicated it to be comprised of about 49.5 weight percent of non-naphthalenes, 2.8 weight percent monomethylnaphthalenes, 19.2 weight percent of dimethylnaphthalenes, and 28.5 weight percent of trimethylnaphthalenes.

EXAMPLE XIII

The solvent and oil of Example XII was admixed on a ratio of 96.0 ml. of solvent to 144.0 ml. of oil at 90° F. to yield 136.0 ml. of a raffinate phase and 106 ml. of an extract phase. On distillation, 50 ml. of the extract phase gave 36.6 ml. of solvent and 13.0 ml. of extract, $n_D^{20}=1.5810$ which is about 19.1 volume percent yield. A liquid-gas chromatograph analysis of this extract oil indicated it to be comprised of about 14.3 weight percent of non-naphthalenes, 7.6 weight percent monomethylnaphthalenes, 38.0 weight percent of dimethylnaphthalenes, and 40.1 weight percent of trimethylnaphthalenes. Distillation of 50 ml. of the raffinate phase gave 4.4 ml. of recovered solvent and 45.4 ml. of oil as pot residue, $n_D^{20}=1.5109$. Gas-liquid chromatograph analysis of this raffinate oil indicated it to be comprised of 51.3 weight percent of non-naphthalenes, 6.3 weight percent of monomethylnaphthalenes, 18.4 weight percent of dimethylnaphthalenes, and 24.0 weight percent of trimethylnaphthalenes.

EXAMPLE XIV

The solvent-oil ratio for this example was 144 ml. of solvent to 96.0 ml. of oil shaken at about 90° F., which results in a raffinate phase amounting to 75.0 ml. and 168.0 ml. of extract phase. The distillation of 50 ml. of the extract phase resulted in 44.6 ml. of solvent, and 9.4 ml. of extract, $n_D^{20}=1.5800$ at about a 33 volume percent yield. Gas-liquid chromatograph analysis of this extract oil indicated it to be comprised of about 14.5 weight percent of non-naphthalenes, 7.6 weight percent monomethylnaphthalenes, 37.9 weight percent of dimethylnaphthalenes, and 40.0 weight percent of trimethylnaphthalenes. Distillation of 50 ml. of the raffinate phase gave 3.4 ml. of recovered solvent and 46.3 ml. of oil as pot residue, $n_D^{20}=1.4970$. Gas-liquid chromatograph analysis of this raffinate oil indicated it to be comprised of 58.4 weight percent of non-naphthalenes, 6.5 weight percent of monomethylnaphthalenes, 14.9 weight percent of dimethylnaphthalenes, and 20.2 weight percent of trimethylnaphthalenes.

EXAMPLE XV

The solvent-oil ratio for this example was on the basis of 192 ml. of solvent to 48.0 ml. of oil shaken at 90° F. to ultimately result in 28.0 ml. of raffinate phase and 215.0 ml. of extract phase. On distillation in packed column, 50 ml. of the extract phase gave 47.4 ml. of recovered solvent and 6.4 ml. of extract, $n_D^{20}=1.5749$ at about 57.3 volume percent yield. Gas-liquid chromatograph analysis of this extract oil indicated it to be comprised of about 15.6 weight percent of non-naphthalenes, 6.9 weight percent of monomethylnaphthalenes, 35.3 weight percent dimethylnaphthalenes, and about 42.2 weight percent of trimethylnaphthalenes. 23.5 ml. of raffinate phase on distillation gave 1.4 ml. of recovered solvent and 22.0 ml. of oil as a pot residue, $n_D^{20}=1.4776$. Gas-liquid chromatograph analysis of the raffinate oil indicated it to be comprised of about 80.9 weight percent of non-naphthalenes and monomethylnaphthalenes combined, 9.7 weight percent of dimethylnaphthalenes, and 9.4 weight percent of trimethylnaphthalenes.

The results of Examples XII–XV, inclusive, are summarized in Table 6, and a comparison of the results of this table with the results of Table 5 shows that the solvent composition at 10 volume percent water, 27 volume percent of furfuryl alcohol, and 63 volume percent of furfural to be somewhat more selective for the system for the removal of naphthalenes than the 10 volume percent water, 36 volume percent furfural and 63 volume percent furfuryl alcohol.

*Table 6*

EXTRACTIONS WITH WATER-FURFURYL ALCOHOL-FURFURAL SYSTEM AT VARIOUS OIL-TO-SOLVENT RATIOS

| Solvent Composition | Oil/Solvent Vol. Ratio | Raffinate/Extract Vol. Ratio, ml./ml. | Solvent-Free Products | | Extract Yield, Vol. Percent |
|---|---|---|---|---|---|
| | | | $n_D^{20}$ Extract | $n_D^{20}$ Raffinate | |
| 10% water, 63% furfural, 27% furfuryl alcohol | 1:0.25 | 31/212 | 1.5843 | 1.5211 | 4.0 |
| 27% furfuryl alcohol | 1:0.67 | 106/136 | 1.5810 | 1.5109 | 19.1 |
| | 1:1.50 | 168/75 | 1.5800 | 1.4970 | 33.0 |
| | 1:4.0 | 215/28 | 1.5749 | 1.4776 | 57.3 |

It is shown from the examples above that extracts of about 83–87 weight percent of the naphthalenes may be obtained utilizing a solvent composition of 10 volume percent water, 27 volume percent furfuryl alcohol and 63 volume percent furfural in an extraction range of 2–9 solvent-to-oil ratios. Also, by using a solvent composition of 10 volume percent water, 36 volume percent furfural and 54 volume percent furfuryl alcohol, extracts contained about 81–92 weight percent of naphthalenes may be obtained over a solvent-to-oil ratio range of 4–9 to 1. In this latter solvent system, the richest extracts are obtained at about 5 to 1 solvent-to-oil ratio. This is substantially better than the best results obtainable at about 87 weight percent of naphthalenes in the extract obtained by the 10 volume percent water, 27 volume percent furfuryl alcohol, and 63 volume percent furfural at a solvent-to-oil ratio of about 1 to 3.

A comparison of the results of the extracts using the ternary component system shows that such a system is superior to furfural saturated with water and provides a substantial latitude of control of both the quality and the quantity of the extract.

While the invention has been described in relation to particular examples, there is no intent to limit the spirit or scope of the invention to the precise details so set forth except insofar as defined in the following claims.

We claim:

1. In a separation of aromatic hydrocarbons from a mixture of the same with non-aromatic hydrocarbon materials by solvent extraction, the step of treating a liquid mixture containing aromatic hydrocarbons with a selective solvent consisting of an intimate mixture of furfural, furfuryl alcohol and water.

2. In the separation of aromatic hydrocarbons from a mixture of the same with other hydrocarbon materials by solvent extraction, the step of treating a liquid mixture containing aromatic hydrocarbons with a selective solvent consisting of an intimate mixture of furfural, furfuryl alcohol and at least about 5 percent by weight of water.

3. In the separation of aromatic hydrocarbons from a mixture of the same with other hydrocarbon materials by solvent extraction, the step of treating a liquid mixture containing aromatic hydrocarbons with a selective solvent consisting of an intimate mixture of a major portion of furfural, furfuryl alcohol and at least about 9 percent by weight of water.

4. In a process for the separation of aromatic hydrocarbons from mixtures of the same with non-aromatic hydrocarbons by solvent extraction, the step of treating a liquid mixture containing aromatic hydrocarbons with a selective solvent consisting of from 90–25 volume percent of furfural, 5 to 60 volume percent of furfuryl alcohol, and from 5 to 25 volume percent of water.

5. A process according to claim 4 in which the solvent consists of about 10 volume percent water, about 36 volume percent furfural and about 54 volume percent furfuryl alcohol.

6. A process according to claim 4 in which the solvent consists of about 10 volume percent water, about 27 volume percent furfuryl alcohol, and about 63 volume percent furfural.

7. A process according to claim 4 in which the solvent consists of a solution of about 10 volume percent of water, about 20 volume percent of furfural, and about 70 volume percent of furfuryl alcohol.

8. A process according to claim 4 in which the solvent consists of a solution of about 10 volume percent water, about 50 volume percent of furfural, and about 20 volume percent of furfuryl alcohol.

9. In a process for the separation of aromatic hydrocarbons from normally liquid mixtures of the same with non-aromatic hydrocarbons by solvent extraction, the step of treating such a liquid mixture containing aromatic hydrocarbons with a liquid selective solvent consisting of about equal parts of furfural and furfuryl alcohol intimately admixed with about 10 volume percent of water.

10. In a process for the separation of aromatic hydrocarbons from a petroleum stream containing mixtures of the same with non-aromatic hydrocarbons by solvent extraction, the step of treating such a mixture containing aromatic hydrocarbons with a selective solvent consisting of from 90–10 volume percent of furfural, 5 to 80 volume percent of furfuryl alcohol, and from 5 to 25 volume percent of water.

11. A process for effecting separation of aromatic hydrocarbons from other non-aromatic hydrocarbons mixed therewith by solvent extraction which comprises extracting a mixture of hydrocarbons containing aromatic hydrocarbons with a solvent consisting of furfural, furfuryl alcohol and water in a temperature range of about 10–50° C. and a pressure of about 1–5 atmospheres, forming an extract phase comprising the aromatic hydrocarbons dissolved in a major portion of the selective solvent and a raffinate phase comprising relatively insoluble hydrocarbons mixed with a minor portion of the selective solvent, separating said phases, and then separating the aromatic hydrocarbons from the selective solvent therein dissolved.

12. A process for effecting separation of aromatic hydrocarbons from other non-aromatic hydrocarbons mixed therewith by solvent extraction which comprises extracting a mixture of hydrocarbons containing aromatic hydrocarbons with a solvent consisting of an intimate mixture of furfural and a significant amount of furfuryl alcohol having dissolved therein from about 5 to 25 volume percent of water in a temperature range of about 10–50° C. and a pressure of about 1–5 atmospheres, forming an extract phase comprising the aromatic hydrocarbons dissolved in a major portion of the selective solvent and a raffinate phase comprising relatively insoluble other hydrocarbons mixed with a minor portion of the selective solvent, separating said phases, and then separating the aromatic hydrocarbons from the selective solvent therein dissolved.

13. A process according to claim 1 in which the mixture of aromatic and non-aromatic hydrocarbons is a petroleum stream.

14. A process according to claim 1 in which the mixture is a virgin petroleum stream.

15. A process according to claim 1 in which the mixture is a refined gas-oil stream.

16. A process according to claim 1 in which the mixture is a light catalytic cycle oil stream.

17. A process according to claim 1 in which the mixture is a light catalytic cycle oil stream in the boiling range of 450–550° C.

References Cited in the file of this patent

UNITED STATES PATENTS 2,745,790     Manley _____ May 15, 1956

OTHER REFERENCES

Perry: Chemical Engineer's Handbook, Third Edition, 1950, pub. McGraw-Hill Book Co., N.Y., pages 718 to 727.